(12) United States Patent
Büchler et al.

(10) Patent No.: US 7,099,241 B1
(45) Date of Patent: Aug. 29, 2006

(54) APPARATUS FOR SCANNING OPTICAL RECORDING MEDIA

(75) Inventors: Christian Büchler, Villingen-Schwenningen (DE); Christoph Dietrich, Heidelberg (DE)

(73) Assignee: Deutsche Thomson—Brandt GmbH, Schwenningen (DE)

( * ) Notice: Subject to any disclaimer, the term of this patent is extended or adjusted under 35 U.S.C. 154(b) by 57 days.

(21) Appl. No.: 09/626,900

(22) Filed: Jul. 27, 2000

(30) Foreign Application Priority Data

Jul. 27, 1999 (DE) ................. 199 34 473

(51) Int. Cl.
*G11B 7/085* (2006.01)

(52) U.S. Cl. ................. 369/44.11; 369/44.26; 369/59.17; 369/59.25

(58) Field of Classification Search ............ 369/53.17, 369/67.22, 30.11, 30.22, 44.26, 47.27, 275.3, 369/275.2, 53.24, 44.28, 53.23, 47.54, 47.23, 369/53.22, 275.4, 44.13, 44.29, 44.1, 30.1, 369/47.22, 59.25, 124.07, 44.11, 44.27, 59.17

See application file for complete search history.

(56) References Cited

U.S. PATENT DOCUMENTS

| | | | |
|---|---|---|---|
| 5,504,725 A | 4/1996 | Katsumata | |
| 5,615,205 A * | 3/1997 | Belser | 369/275.4 |
| 5,848,050 A * | 12/1998 | Nagasawa et al. | 369/275.4 |
| 5,872,767 A | 2/1999 | Nagai et al. | 369/275.3 |
| 5,892,740 A | 4/1999 | Nagasawa et al. | |
| 5,991,243 A * | 11/1999 | Ishi et al. | 369/30.12 |
| 6,044,051 A * | 3/2000 | Miyagawa et al. | 369/47.19 |
| 6,069,869 A * | 5/2000 | Nagasawa et al. | 369/275.3 |
| 6,069,870 A * | 5/2000 | Maeda et al. | 369/275.4 |
| 6,185,170 B1 * | 2/2001 | Yoon et al. | 369/44.29 |
| 6,269,071 B1 * | 7/2001 | Van Den Enden et al. | 369/275.4 |
| 6,333,902 B1 * | 12/2001 | Shim | 369/47.54 |
| 6,377,522 B1 * | 4/2002 | Toda | 369/44.26 |
| 6,400,660 B1 * | 6/2002 | Lee et al. | 369/44.26 |
| 6,421,308 B1 * | 7/2002 | Kizu et al. | 369/53.17 |
| 6,459,661 B1 * | 10/2002 | Iwanaga | 369/44.26 |
| 6,469,979 B1 * | 10/2002 | Joo et al. | 369/275.3 |

FOREIGN PATENT DOCUMENTS

DE     19716967 A1     11/1997

(Continued)

OTHER PUBLICATIONS

German Search Report citing the above-listed references: AA, and AM.
*Abstract of corresponding British patent GB2312320 is enclosed.
Search Report for European Application No. 00114908.7-2210 dated Jun. 6, 2002.

*Primary Examiner*—William Korzuch
*Assistant Examiner*—Kim-Kwok Chu
(74) *Attorney, Agent, or Firm*—Joseph J. Laks; Harvey D. Fried; Patricia A. Verlangie

(57) ABSTRACT

An apparatus for reading and/or writing data markings of an optical recording medium having data markings arranged along a track and header markings arranged laterally offset with respect to the center of the track, the apparatus having a header identification unit. According to the present invention an intermediate track signal is formed, which enables direction identification during the traversal of tracks. The present invention comprises an apparatus having a header sequence detector, a track crossing detector and an intermediate track detector, wherein the intermediate track detector is connected to outputs of the header identification unit, the track crossing detector and the header sequence detector, and generates an intermediate track signal.

12 Claims, 7 Drawing Sheets

FOREIGN PATENT DOCUMENTS

| | | |
|---|---|---|
| EP | 0751504 | 1/1997 |
| EP | 0886265 | 12/1998 |
| EP | 1 073 044 A2 | 1/2001 |
| WO | 97/50083 | 12/1997 |

* cited by examiner

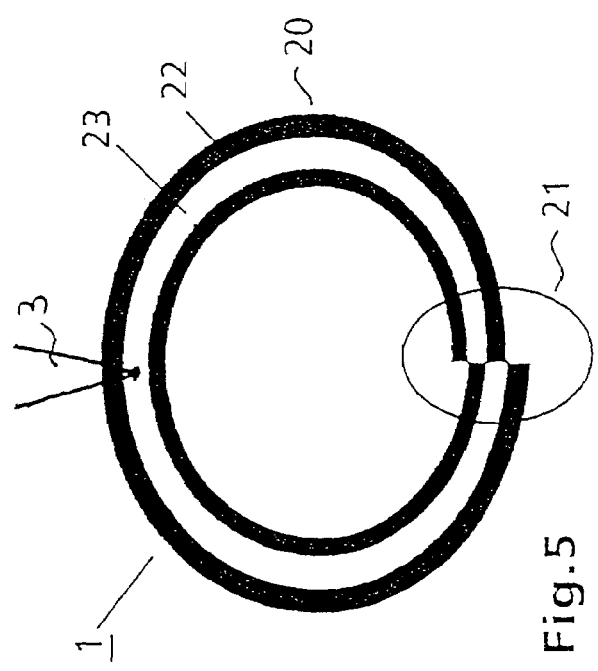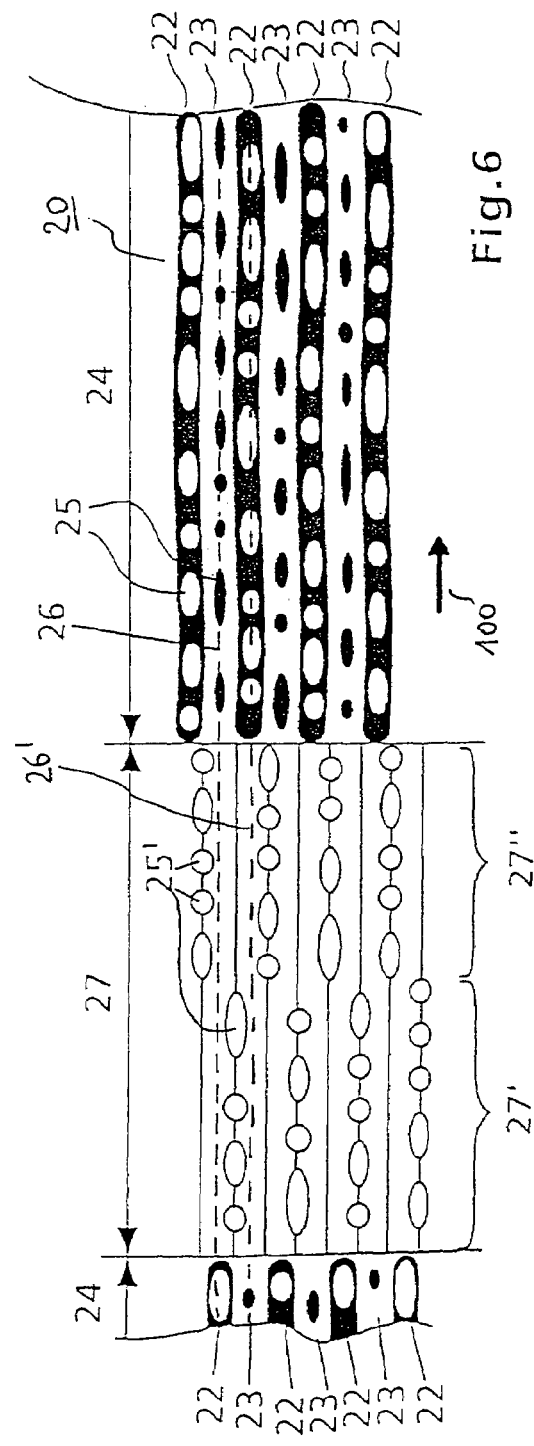

APPARATUS FOR SCANNING OPTICAL RECORDING MEDIA

FIELD OF THE INVENTION

The present invention relates to an apparatus for reading data markings from and/or writing data markings to an optical recording medium, the recording medium having or being provided for having data markings arranged along a track and header markings arranged laterally offset with respect to the centre of this track, and the apparatus having a header identification unit. The order in which the header markings are offset from the centre of the track indicates, in recording media of this type, whether a track or an intermediate track follows the currently detected header area.

BACKGROUND OF THE INVENTION

An apparatus of this type is disclosed in EP-A2-0 801 382. This apparatus is suitable for the use of optical recording media having data markings both in the track and in the intermediate track, so-called land and groove recording media. The known apparatus may be regarded as having the disadvantage that it is not possible, during the traversal of the tracks in the radial direction during the use of such recording media, to obtain information about the direction in which the light beam traverses the tracks of the recording medium. The so-called mirror signal which is generated for this purpose in the case of conventional data media and detects a region free of data markings, the so-called mirror area, has a doubled frequency in the case of land and groove recording media. Owing to the data markings that are present there, the track and (intermediate track) have a lower reflectivity than the region located between track and intermediate track, in which region the mirror signal is then at a maximum. Consequently, a comparison of the phase angle of the track error signal and of the mirror signal for the purpose of direction identification is no longer meaningful, on account of the doubled frequency of the mirror signal.

SUMMARY OF THE INVENTION

An object of the present invention is to propose an apparatus in which an intermediate track signal is formed, which enables direction identification during the traversal of tracks.

This object is achieved by virtue of the fact that the apparatus has a header sequence detector, a track crossing detector and an intermediate track detector, which is connected to outputs of the header identification unit, of the track crossing detector and of the header sequence detector, and generates an intermediate track signal. This has the advantage that an intermediate track signal is generated, thereby enabling reliable direction identification in the course of track crossing. A further advantage is that the intermediate track signal can be used to ascertain whether the track crossing operation will end on a track or on an intermediate track. Settings of the apparatus, for example parameters for the regulating circuits required for tracking, can thus be set to the expected track or intermediate track. This is advantageous particularly for recording media in which a changeover is frequently made between track and intermediate track without an offset.

An apparatus according to the invention advantageously has a validity detector, which is connected to the output of a track crossing frequency detector and outputs a validity signal. This has the advantage that a condition under which an erroneous intermediate track signal can occur, but need not occur, is detected and a corresponding validity signal is output. An example of such a condition is the presence of a low track crossing frequency. In this case, the situation may arise whereby the intermediate track signal is not formed correctly, since it is probable that the relative direction of movement between scanning beam and track is reversed. The validity signal is set to "invalid" if a defined minimum value of the track crossing frequency is undershot, and is set to the value "valid" again if a suitable criterion occurs, such as, for example, a specific value of the track crossing frequency being exceeded or the detection of a header area.

The invention furthermore provides for the header identification unit to have a high-frequency path, a low-frequency path and a signal detector, and to have a track error signal applied to it. This has the advantage of enabling reliable identification of the header areas. The track error signal contains information both about the track position and about the order, the sequence of header areas passed. The presence of the components originating from header areas in the track error signal is checked by means of the high-frequency path, and the reliability is checked in the low-frequency path. The closer to the track centre the scanning beam is, the more reliable the header identification is. From the signals of the two paths, the signal detector generates a header identification signal.

According to the invention, the header sequence detector has envelope detectors, to which a high-frequency component of a track error signal is fed, and whose outputs are connected to a comparator. This has the advantage that the order of the header markings which are arranged offset can be detected in a simple manner. Header markings leave behind high-frequency modulations in the track error signal, whose envelope is advantageously utilized for detecting the order.

In an advantageous manner, the header sequence detector has a phase detector, which is fed signals derived from detector elements of a multi-zone detector of the apparatus. This has the advantage that the header sequence determination is effected independently of the track error signal, that is to say interfering influences that may be present in the track error signal are not used for evaluation purposes. This increases the reliability of the intermediate track signal formed. The photodetector used is advantageously a photodetector that is already present in the apparatus, for example a photodetector which can be used for tracking in accordance with the differential phase detection method during the reading of recording media which are correspondingly suitable therefor.

The track crossing detector advantageously has a track error signal applied to it, and has a phase shifter or a peak value detector. This has the advantage that the track crossing detector outputs a pulse or a corresponding signal in or near the maxima and minima of the track error signal.

A method according to the invention for generating an intermediate track signal in an apparatus for writing or reading data markings of an optical recording medium having data markings arranged along a track and header markings arranged laterally offset with respect to the centre of this track consists first of all in checking a signal derived from detector elements of the apparatus for the presence of signal components which are typical of header areas. Given the presence of signal components of this type, the order of signal components originating from differently arranged header markings is determined; furthermore, a signal corresponding to the track crossing frequency is generated and an intermediate track signal is generated from the order information and the signal corresponding to the track crossing frequency, for example by counting down the track crossings. This has the advantage that, even though the order of the information is only determined in each case when the signal components which are typical of header areas occur, an intermediate track signal is always present by way of the updating by means of the signal corresponding to the track crossing frequency.

A development of the method according to the invention provides for the track crossing frequency to be detected, and, if a limit value is undershot, an invalidity signal to be generated, which is cancelled only when signal components which are typical of header areas are present once again. This has the advantage of increasing the reliability of the determination of the intermediate track signal. The invalidity signal indicates that conditions under which the updated intermediate track signal may be erroneous are present. This signal serves, for example, to ensure that the conclusions which can be correspondingly derived from the intermediate track signal, such as the direction information for example, are not utilized, or are utilized only with reservations, in this case.

It goes without saying that the invention also comprises developments and modifications which are within the abilities of those skilled in the art and are not specified in detail here. Advantageous configurations of the invention are described below with reference to the figures.

BRIEF DESCRIPTION OF THE DRAWINGS

FIG. 5 shows a schematic illustration of an optical recording medium provided with data and header markings;

FIG. 6 shows a schematic illustration of a header area of the optical recording medium in accordance with FIG. 5;

DETAILED DESCRIPTION OF PREFERED EMBODIMENTS

Figure 1:
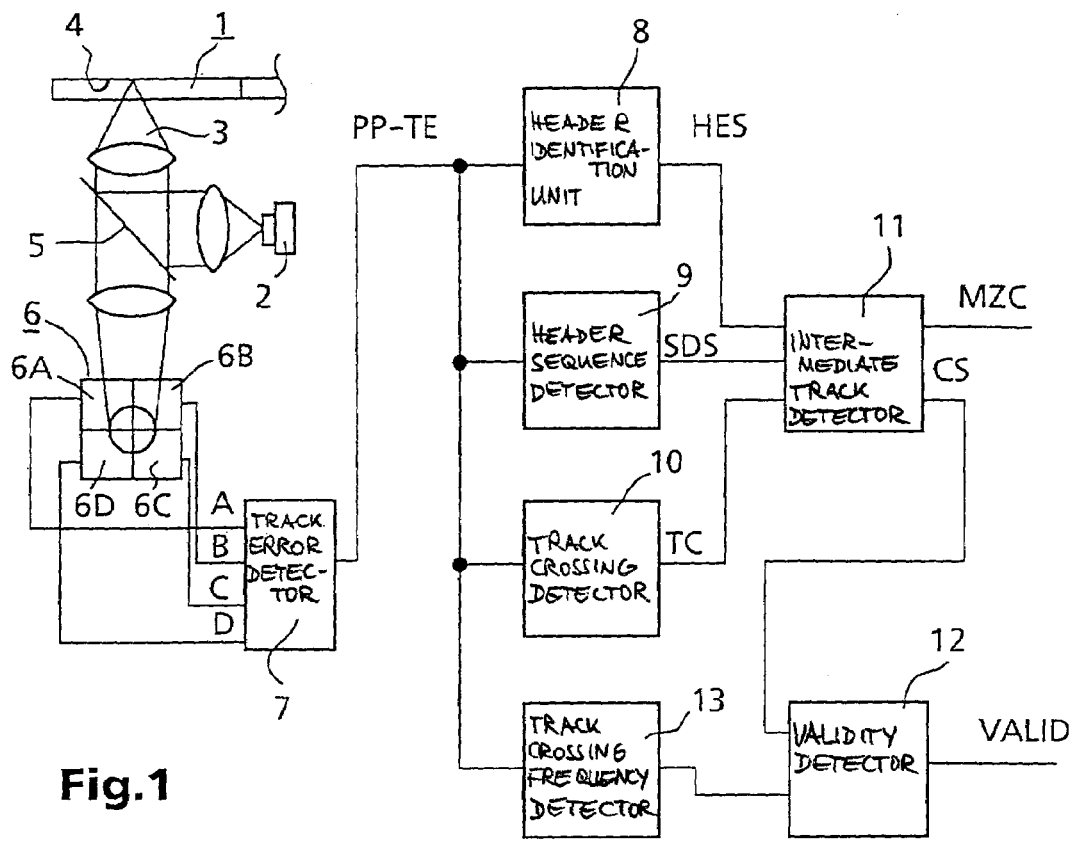
FIG. 1 shows a schematic illustration of an apparatus according to the invention.

FIG. 1 shows a schematic illustration of an apparatus according to the invention. A recording medium 1, which is illustrated in section, is scanned by means of a light beam 3 generated by a light source 2. In this case, the light beam 3 is focused onto an information-carrying layer 4 of the recording medium 1. The light beam 3 is reflected from the information-carrying layer 4, passes through a semi-transparent mirror 5 and arrives at a multi-zone detector 6. The latter has four detector elements 6A, 6B, 6C, 6D in the exemplary embodiment. The detector signals A, B, C, D output by the detector elements are fed to a track error detector 7, which outputs a track error signal PP-TE. The track error signal PP-TE is fed to a header identification unit 8, which outputs a header identification signal HES when a header area is present. The track error signal PP-TE is furthermore fed to a header sequence detector 9, which outputs a sequence detector signal SDS. The track error signal PP-TE is furthermore fed to a track crossing detector 10, which is provided with a phase shifter and outputs a track crossing signal TC. The header identification signal HES, the sequence detector signal SDS and the track crossing signal TC are fed to an intermediate track detector 11, which forms an intermediate track signal MZC from them. The intermediate track detector 11 furthermore outputs a control signal CS, which is fed to a validity detector 12. The latter is furthermore connected to the output signal of a track crossing frequency detector 13 and determines a validity signal VALID from its input signals.

The method of operation of the apparatus according to FIG. 1 will now be described by way of example using a recording medium 1 which is also referred to as DVD-RAM. A recording medium 1 of this type is described in more detail in relation to FIGS. 5 and 6. A specific property of a recording medium in accordance with the DVD-RAM system is that for the purpose of data recording tracks are used which are formed either as depression, mainly referred to as groove 22 below, or as elevation or non-depression, referred to as land 23 below. As is also the case with other recording media, it is desirable in this case that a jump can be carried out from any arbitrary point on the recording medium 1 to any other point. In this case, the destination of such a jump may reside either in a groove 22 or on a land 23. A further property of the DVD-RAM system is that pre-impressed header areas 27 are provided between the data areas 24 and have header markings 25', so-called prepits, arranged offset with respect to the track centre 26, 26'. A light beam 3 following the track centre 26 thus registers firstly a first header area 27', offset to the right for example, and then a second header area 27", offset to the left. The order of the first and second header areas 27', 27" is identified by means of the header sequence detector 9. The latter evaluates the high-frequency component of the track error signal PP-TE. Proceeding from the track centre 26 as seen in the scanning direction, see arrow 100, the order of the header markings 25' read is thus offset firstly to the right and then to the left. If, on the other hand, the track centre 26' is followed, then header markings 25' occur which are offset firstly to the left and then to the right. This order of the signal components of the track error signal PP-TE which is caused by the header areas 27', 27" represents whether the light beam 3 will impinge on land 23 or groove 22 in the next data area 24. The order information contained in the sequence detector signal SDS is particularly important, therefore, because a changeover between groove 22 and land 23, that is to say a changeover in the type of data track 20, occurs once per revolution of the recording medium 1.

As long as the light beam 3 follows the data track 20, that is "to say as long as a tracking regulating circuit is closed, the order of the header areas 27 can be detected without a high degree of complexity. However, it is necessary precisely in the event of a jump across a relatively large distance, that, prior to the end of the jump the information be available concerning the direction in which the light beam 3 moves towards which type of data tracks, groove 22 or land 23, in order to achieve reliable locking of the track regulating circuit to the desired data track 20. That is to say with the track regulating circuit open, it is necessary to know the type of data track on which the closing of the tracking regulator, that is to say the beginning of following of a data track 20, will happen.

If such a jump is carried out, then it may occur that the light beam 3 needs to cross the data tracks 20 at any time in a manner that cannot be predetermined. Since the movement of the light beam 3 transversely with respect to the data tracks 20 in the event of such a jump is comparatively small compared with the reading speed, which is governed by the rotation of the recording medium 1, the angle of the movement of the light beam 3 relative to the data tracks 20 is relatively acute. If the light beam 3 crosses a track at the level of a header area 27 precisely in the track centre 26, then the order of the header areas 27', 27" can be identified in spite of the tracking regulating circuit that is not closed. If, on the other hand, the light beam 3 crosses the header area 27 outside the track centre 26, then the amplitude of the signal components caused by the header markings 251 in the track error signal PP-TE decreases more and more with greater deviation from the track centre 26. In such cases, the order of the header areas 271, 27" can be identified less and less well on account of the decreasing amplitude. The header identification unit 8 evaluates the track error signal PP-TE in respect of whether or not the light beam 3 is close enough to the track centre 26. If it is close to the track centre 26, a header identification signal HES is output. Otherwise, the intermediate track detector 11 does not evaluate the signal SDS output by the header sequence detector, since such evaluation would, with high probability, lead to an incorrect result.

If the order of the header areas 27', 27" has not been identified because of such an unfavourable track position of the light beam 3, it is nevertheless possible, with a degree of certainty, to ascertain the position of the light beam relative to the data track 20. In this case, it is assumed that the speed of the light beam 3 relative to the data track 20 only varies continuously, that is to say essentially only increases or only slows down. The current speed can be determined from the track error signal PP-TE. If the frequency of the track crossing signal TC lies above a predetermined value, then it can be assumed that the direction of the movement of the light beam 3 with regard to the data tracks 20 does not change. In this way, between the crossing of two header areas 27 that can be evaluated, counting is effected, for example, to ascertain whether the light beam 3 is currently moving precisely towards a groove 22 or a land 23. If the track crossing frequency TC falls below a predetermined value, then, in accordance with one variant of the invention, this information is fed to the track regulating circuit as an indicator of unreliability. The validity detector 12 determines the validity signal VALID from the signal output by the track crossing frequency detector 13 and a control signal CS output by the intermediate track detector 11.

Figure 2:
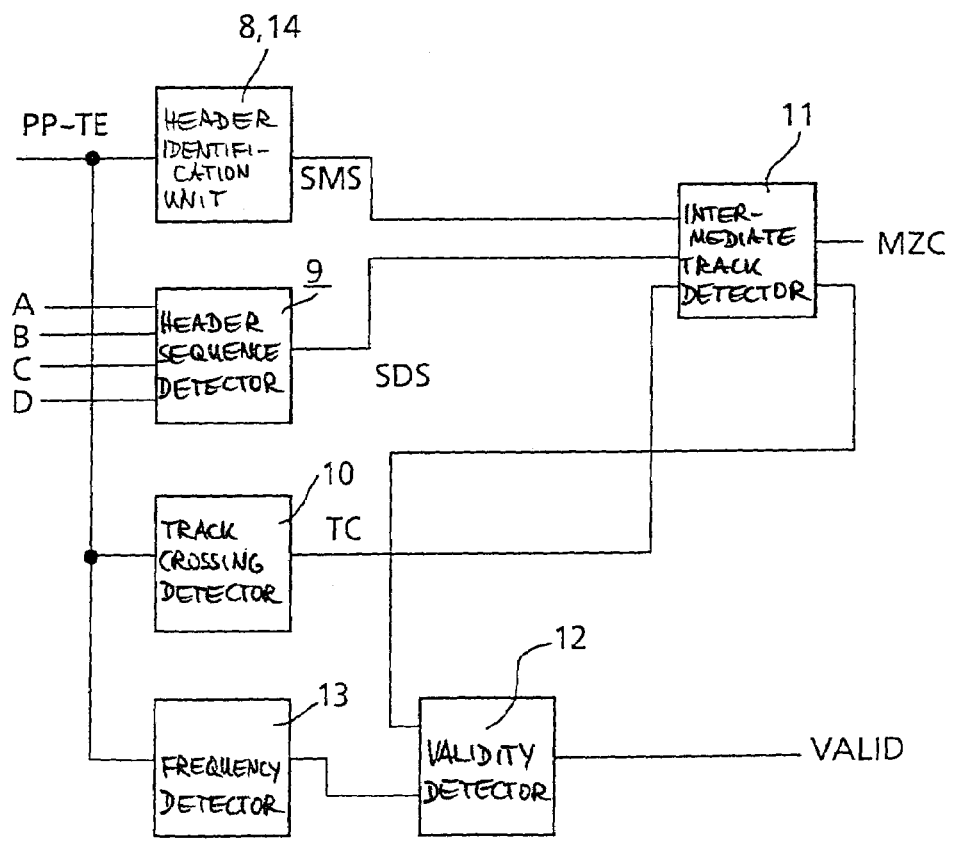
FIG. 2 shows a schematic illustration of a second embodiment of an apparatus according to the invention.

FIG. 2 shows a schematic illustration of a second embodiment of an apparatus according to the invention. Track error signal PP-TE and the detector signals A, B, C, D are formed in the manner explained in relation to FIG. 1. In this case, too, the track error signal PP-TE is fed to a header identification unit 8, a track crossing detector 10 and a track crossing frequency detector 13. The header identification unit 8 has a track centre detector 14, which uses the track error signal PP-TE to determine whether the light beam is sufficiently close to the track centre 26, and outputs a track centre signal SMS. A header sequence detector 9 determines a sequence detector signal SDS from the detector signals A, B, C, D. Track centre signal SMS and sequence detector signal SDS are fed together with the track crossing signal TC to the intermediate track detector 11, which determines the intermediate track signal MZC from them. The validity detector 12, which generates the validity signal VALID, is fed not only the output signal of the track crossing frequency detector 13 but also the control signal CS.

Figure 3:
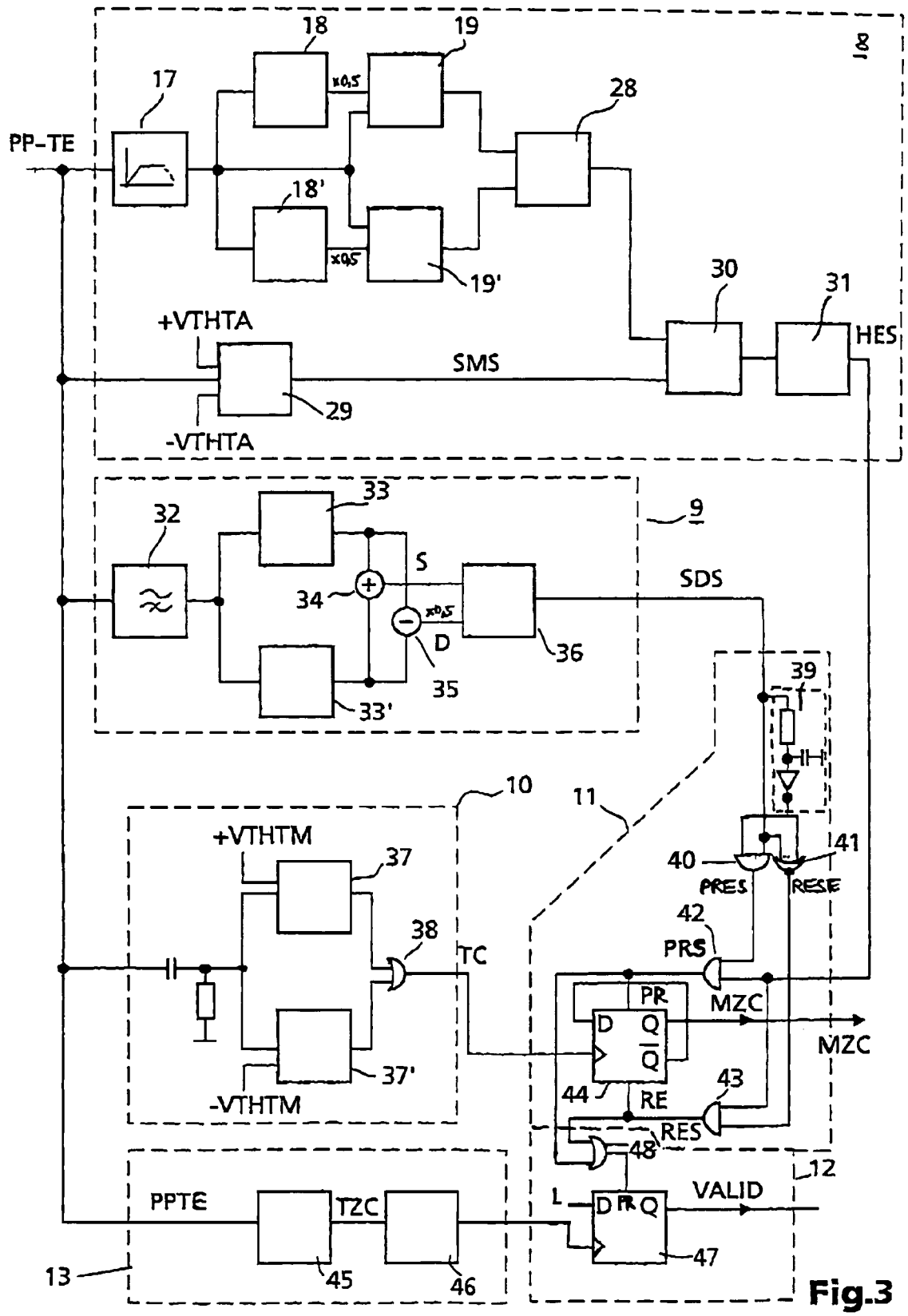
FIG. 3 shows a variant of an apparatus according to the invention.

FIG. 3 shows a variant of an apparatus according to the invention, in which the individual components are described in more detail. The header identification unit 8 has the task of comparing the amplitude of the header signals with a predetermined threshold, and of passing on the information that this threshold has been exceeded as information "header present". For this purpose, it has a bandpass filter 17, whose input signal is the track error signal PP-TE and whose output signal is fed to envelope detectors 18, 18' and comparators 19, 19'. The envelope detector 18 detects and, in the process, retains the upper envelope of its input signal and forwards half the value thereof to the first comparator 19, while the other envelope detector 18' determines the lower value of the envelope, retains it and, having halved it, forwards it to the second comparator 19'. If the bandpass-filtered track error signal exceeds half the value of the upper envelope, then the comparator 19 outputs a signal to an OR gate 28, and, if it falls below half the value of the lower envelope, then the comparator 19 outputs a signal to the OR gate 28. Reliable identification of the order of the header areas 27, 27' is generally possible only when the said header areas supplying a minimum amplitude. To that end, the low-frequency component of the track error signal PP-TE is filtered out. As a result of the clipping of the high frequency components, the pulse trains caused by the header markings 25' are averaged. The highest levels of the header markings 25' in each case are retained with the aid of the envelope detectors 18, 18'. If the amplitude of the bandpass-filtered signal caused by the header markings 25' exceeds a predetermined threshold, for example, then a signal is output to the OR gate 28. The order of the header areas 27', 27" can be ascertained exactly when the header area 27 is crossed in or virtually in the track centre 26. The track error signal PP-TE directly indicates the track deviation; it is therefore fed to a window comparator 29, which determines whether the track error signal PP-TE lies within a predetermined range of values ±VTHTA. If this is the case, then it forwards a track centre signal SMS to an AND gate 30, to which the output signal of the OR gate 28 is likewise fed. The output signal of the AND gate 30 is fed to a trigger 31, which, shortly after the occurrence of its input signal, enables a short time window in which the sequence detector signal SDS is enabled for evaluation purposes. According to one variant of the invention, the window comparator 29 and the AND gate 30 are dispensed with. These elements are not necessary for determining the header identification signal HES, but they do increase the certainty of the enable signal HES being supplied at the correct point in time. A further variant of the invention provides for a high-pass filter, not illustrated here, having a low cut-off frequency for suppressing superposed offset voltages to be connected upstream of the window comparator 29.

The header sequence detector 9 has a high-pass filter 32 for suppressing superposed offset voltages, at whose input the track error signal PP-TE is present and whose output is connected to fast envelope detectors 33, 33'. The output signals of the upper envelope detector 33 and of the lower envelope detector 33' are fed to a summer 34 and to a subtractor 35. A comparator 36 compares the output signal of the summer 34 relative to half the value of the output signal of the subtractor 35. Its output signal, the sequence detection signal SDS, indicates whether the output signal of the summer 34 has a rising or a falling zero crossing relative to the output signal of the subtractor 35. A rising or positive zero crossing is an indication of the fact, for example, that the header markings 25' are located firstly on the left and then on the right of the track centre 26; a falling or negative zero crossing is an indication of the fact that, in this example, header markings 25' occur which firstly are offset to the right with respect to the track centre 26 and then are offset to the left. The track error signal PP-TE reaches the envelope detectors 33, 33' in a manner coupled to AC voltage; that component in the input signal of the envelope detectors 33, 33' which is caused by the header markings 25' is ideally balanced with respect to zero. The difference between the outputs of the envelope detectors 33, 33' is thus a reference figure for the magnitude of the amplitudes of the signal component caused by the header markings 25'. The summation signal output by the summer 34 shows whether the upper envelope detector 33 or the lower envelope detector 33' receives a signal first.

The track crossing detector 10 has two comparators 37, 37', which compare the track error signal PP-TE with an upper threshold value +VTHTM and a lower threshold value −VTHTM, respectively. The output signals of the comparators 37, 37' are fed to an OR gate 38, which outputs the track crossing signal TC. In this embodiment of the track crossing detector 10, it is assumed that the track error signal PP-TE assumes a maximum or a minimum in each case between two areas of the data track 20, that is to say between groove 22 and land 23. The threshold values +VTHTM and −VTHTM are set such that they are somewhat lower than the maximum and minimum values of the track error signal PP-TE. Thus, the outputs of the comparators 37, 37' do not toggle at the zero crossing of the track error signal PP-TE, but rather shortly before the positive or the negative maximum value is reached, which corresponds to a phase shift of almost 90°. On account of the logic combination by means of the OR gate 38, the track crossing signal TC has a positive edge whenever the track error signal PP-TE has reached an extreme value. A positive edge in the track crossing signal TC is thus an indication of the fact that the light beam 3 is situated between a groove 22 and a land 23. In accordance with one variant of the invention, the threshold values +VTHTM and −VTHTM are matched automatically to the amplitude of the track error signal PP-TE. To that end, by way of example, use is made of envelope detectors in accordance with the envelope detector 18 in FIG. 3. Predetermined fractions of the voltages formed by these envelope detectors are used further as threshold values +VTHTM and −VTHTM.

The exemplary embodiment of the intermediate track detector 11 as specified in FIG. 3 first of all has a logic circuit for conditioning the sequence detection signal SDS. The sequence detection signal SDS is fed to an inverting delay element 39 and to an AND gate 40 and to an inverting OR gate 41. The latter is furthermore fed the signal output by the inverting delay element 39. The output signal PRES of the AND gate 40 is fed to a further AND gate 42. The output signal RESE of inverting OR gate 41 is fed to a further AND gate 43. The header identification signal HES is present at the respective other input of the AND gates 42, 43. The output signal PRS of the AND gate 42 is fed to the set input PR of a D flip-flop 44, and the output signal RES of the AND gate 43 is fed to the reset input RE of the D flip-flop 44. The track crossing signal TC is present at the clock input of the D flip-flop 44, and the output signal Q of the D flip-flop 44 is the intermediate track signal MZC. The inverting output $\overline{Q}$ of the D flip-flop 44 is connected to the D input thereof. The intermediate track detector 11 serves for generating an intermediate track signal MZC from its three input signals HES, SDS and TC, said intermediate track signal corresponding to the mirror signal in the scanning of conventional recording media. When the light beam 3 moves past a header area 27 which can be evaluated—that is to say is traversed in the vicinity of the track centre 26—, the header identification signal HES enables the possibility, via the AND gates 42, 43, of setting or resetting the D flip-flop 44. The question of whether setting or resetting is effected depends on the order identified by the header sequence detector 9 at this instant. The sequence detector signal SDS has either a positive or a negative edge. By means of the inverting delay element 39, the AND gate 40 and the inverting OR gate 41, a pulse is generated in the output signal PRES of the AND gate 40 for each positive edge of the sequence detector signal SDS and a pulse is generated in the output signal RESE of the inverting OR gate 41 for each negative edge. The D flip-flop 44 is correspondingly set or reset. Proceeding from this set state, the output signal Q of the D flip-flip 44 changes its state with each positive edge of the track crossing signal TC present at its clock input. This ensures that an output signal, the intermediate track signal MZC, which reproduces the position of the light beam 3 with respect to the data track 20 is generated even between two or more header areas 27 that cannot be used for evaluation purposes, for example because they are not detected in the track centre 26.

The track crossing frequency detector 13 has a comparator 45, which compares the track error signal PP-TE with a reference value, preferably the average value thereof. Its output signal is the track centre signal TZC, which has an edge in each case in the track centre 26. This track centre signal TZC is fed to a frequency detector 46, which outputs a pulse if the frequency of its input signal lies below a predetermined minimum frequency. This output signal of the track crossing frequency detector 13 is fed to the clock input of a D flip-flop 47 of the validity detector 12. The set input PR of the D flip-flop 47 is connected to the output of an OR gate 48, at whose inputs the output signal PRS of the AND gate 42 and the output signal RES of the AND gate 43 are present. The D input of the D flip-flop 47 is at "low", and the validity signal VALID is output at its Q output. The track crossing frequency detector 13 thus generates the track centre signal TZC and checks the frequency thereof. It thus checks the speed at which the light beam 3 moves transversely with respect to the direction of the data tracks 20. If the value of the frequency of the track centre signal TZC falls below a predetermined value, then a reversal of the direction of movement of the light beam 3 transversely with respect to the data tracks 20 cannot be precluded. In this case, the intermediate track signal MZC generated by the intermediate track detector 11 is reliable only to a limited extent. Only after the occurrence of a header area 27, that is to say if either the output signal PRS or the output signal RES is present, is the intermediate track signal MZC reliably error-free. Momentary undershooting of the minimum value of the frequency of the track centre signal TZC, that is to say an input signal at the clock input of the D flip-flop 47, resets the validity signal VALID to zero or "low"; it is set again via the set input PR when the next detectable header area 27 is traversed.

Figure 4:
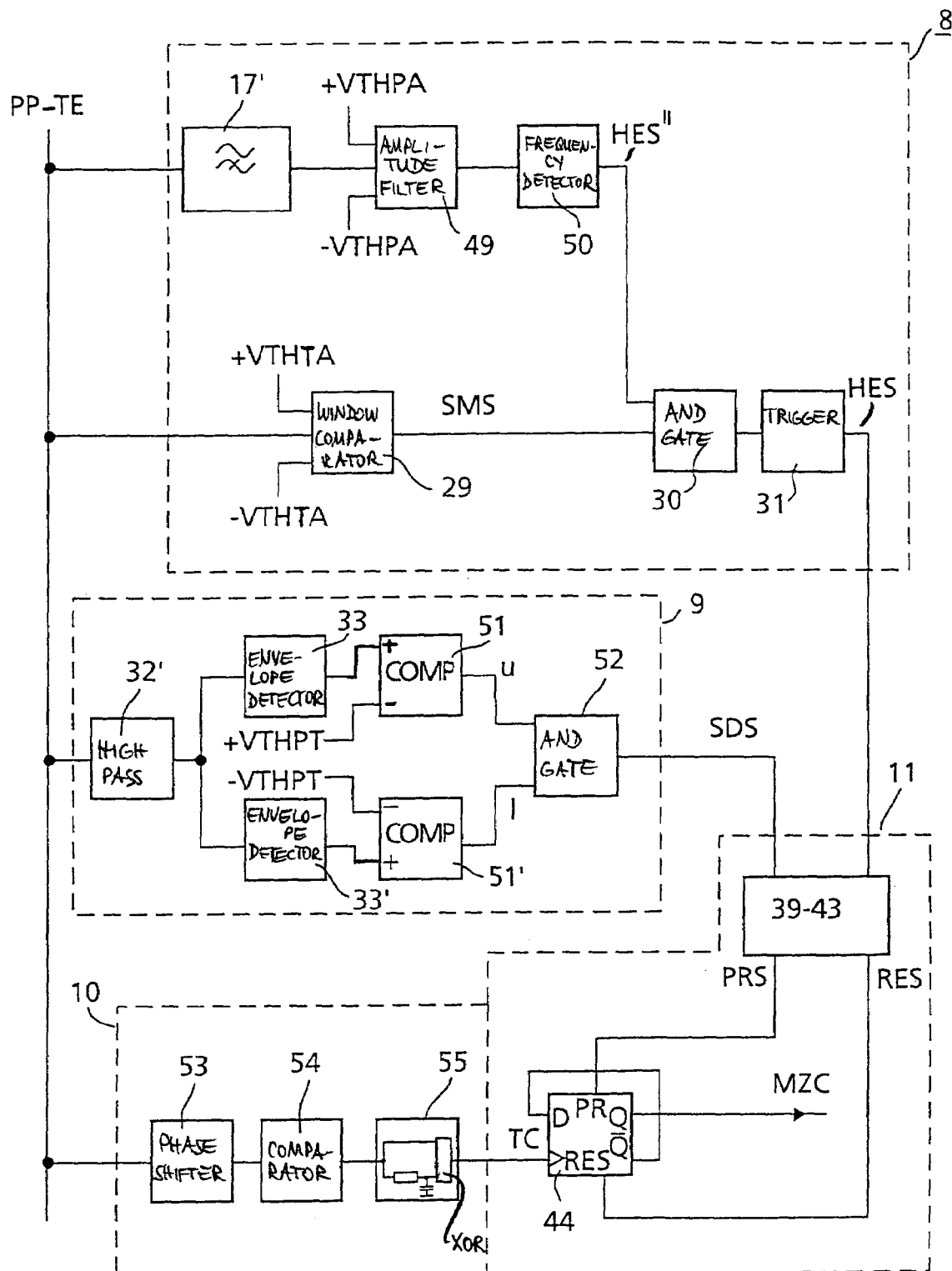
FIG. 4 shows a further variant of an apparatus according to the invention.

FIG. 4 shows a further variant of an apparatus according to the invention, where principally the differences from FIG. 3 are illustrated and will be described. The individual blocks described in relation to FIG. 3 and FIG. 4 are also expediently usable or modifiable in other combinations. They only specify advantageous possibilities for realization; expert modifications are not precluded. The header identification unit 8 has a high-pass filter 17', whose limiting frequency is of the order of magnitude of $f_c \approx 1$ MHz, for example, an amplitude filter 49 and a frequency detector 50. Window comparator 29, AND gate 30 and trigger 31 correspond to those described in relation to FIG. 3. Those components in the track error signal PP-TE which are caused by the header markings 25' have both a specific minimum frequency and a specific minimum amplitude. Only edges of the high-pass-filtered track error signal PP-TE whose amplitudes are respectively greater or less than a threshold value ±VTHPA pass through the amplitude filter 49 and their frequency is compared with a minimum frequency in the downstream frequency detector 50. If both amplitude and frequency of those components of the track error signal PP-TE which are caused by the header markings 251 are high enough, then a first header identification signal HES" is output, which serves as one of the input signals of the AND gate 30. The frequency detection prevents the header identification unit 8 from responding to scratches on the recording medium 1 which, although they exhibit signal components with a sufficient amplitude, as a rule exhibit a frequency that is too low to pass through the frequency detector 50.

The header sequence detector 9 has a high-pass filter 32', fast envelope detectors 33, 33', comparators 51, 51' and an AND gate 52. The limiting frequency of the high-pass filter 32' is $f_c \approx 300$ kHz, for example. The envelopes of the signal components caused by the header markings 25' situated in the header areas 27', 27" are each compared relative to a predetermined threshold value ±VTHPT by means of a comparator 51 and 51', respectively. The output signal of the comparator 51 has a value "high" whenever the upper envelope exceeds the upper threshold value +VTHPT, and the output signal of the comparator 51' has a value "high" as long as the lower envelope does not fall below the lower threshold value −VTHPT. The output signal of the AND gate 52, the sequence detection signal SDS, assumes the value "high" whenever the upper envelope lies above the upper threshold value +VTHPT and, at the same time, the lower envelope does not lie below the lower threshold value −VTHPT. In the period of time which is under consideration and is determined by the header identification signal HES, the sequence detection signal SDS therefore has a high-low transition if, by way of example, firstly header markings 25' which are offset to the left and then header markings 25' which are offset to the right occur, while it has a low-high transition in the event of a reversed order of the header markings 25'.

Header identification signal HES and sequence detection signal SDS are fed to the modules 39 to 43, this being indicated in FIG. 4 by means of a block whose output signals PRS, RES, as described in relation to FIG. 3, are fed to the D flip-flop 44 and to the validity detector 12, which is not illustrated here. The intermediate track detector 11 thus corresponds to that described in relation to FIG. 3.

The track crossing detector 10 has a phase shifter 53, whose output signal is fed to a comparator 54. The output signal of the latter is fed to an edge detector 55, whose output signal is the track crossing signal TC. The track error signal PP-TE, which is coupled in terms of AC voltage, is phase-shifted by about 90° by the phase shifter 53, whose method of operation is not described in any more detail here, and fed to the comparator 54. The latter compares its input signal with the average value thereof, for example, and each edge of its output signal thus corresponds to a zero crossing of the track error signal PP-TE shifted by 90°. This signal is doubled with the aid of the edge detector 55, whose input signal is fed directly and with a time delay to an EXCLUSIVE-OR gate XOR. This means that each edge in the output signal of the comparator 54 effects a positive edge of the track crossing signal TC. In this way, too, it is possible to count the number of groove 22 and land 23 crossed.

FIG. 5 shows a schematic illustration of a recording medium 1 that can be read from and/or written to by an apparatus according to the invention. Three turns of a data track 20 are illustrated, the said data track being illustrated with its width greatly exaggerated. The data track 20 is of spiral design and changes at least one of its properties after each revolution. This is emphasized in FIG. 5 by the transition area 21, identified by means of an ellipse. Those parts of the data track 20 which are shown dark are formed by grooves 22 in the information-carrying plane of the optical recording medium 1, while those areas of the data track 20 which are shown light do not have depressions and are referred to as land 23. The data track 20 is scanned in a known manner by means of a focused light beam 3.

The transition area 21 is emphasized in a greatly enlarged manner in FIG. 6. A plurality of data tracks 20 running essentially parallel can be discerned in the right-hand part and in the far left part of FIG. 6. The impressed, continuous grooves 22 lie between the non-impressed tracks referred to as land 23. Data areas 24 with data markings 25 arranged in a centred manner are illustrated in the right-hand area and in the far left area of FIG. 6. The data markings 25 are arranged essentially centred with respect to a track centre 26 illustrated by a broken line by way of example. The markings 25, which are often also referred to as pits, for their part consist, for example, in depressions or elevations relative to the corresponding data track, of areas of increased or decreased reflectivity in comparison with the rest of the data track, in areas which change the direction of polarization of the light, or generally of areas which are suitable in some way for modulating the impinging light beam 3 in terms of an optical or other, for example electromagnetic, property.

Situated between the areas 24 of centred markings is a header area 27 with header markings 25' arranged off-centre. The header area 27 of off-centre markings itself is again subdivided into a first header area 27' and a second header area 27" having header markings 25' which are offset differently. Thus, the header area 27 has header markings alternately offset to the right and to the left with respect to the track centre or header markings offset to the left and to the right with respect to the track centre, depending on whether the header area 27 is traversed from left to right in the track direction coming from a groove 22 or coming from a land 23.

Although only the transition area 21 is illustrated in FIG. 6, a multiplicity of header areas 27 are arranged alternately with data areas 24 per revolution of the data track 20. The extent of the header areas 27 in the track direction is in each case significantly shorter than that of the data areas 24. It is envisaged that the header areas 27 and also the off-centre header markings 25' arranged there will already be fixedly predetermined during the production of the recording medium 1, while the data markings 25 in the data area 24 will not yet be present during the production of the recording medium 1. They can then be written to the recording medium by the apparatus according to the invention. In order to ensure suitable tracking in the data areas 24 that have not yet been written to, the properties designated as land 23 and as groove 22 are likewise already fixedly predetermined during the production of the recording medium. In a special variant of the recording medium 1, provision is made for allowing the data track 20 to run in a slightly wave-like manner in the data area 24. This is also referred to as "wobbling". From the frequency of this wobble, it is possible to obtain further information that is useful or necessary for the operation of the apparatus. It is understood that the exemplary embodiment of a recording medium as specified in FIGS. 5 and 6 is mentioned only by way of example. Recording media which do not have all of the features mentioned, or which have additional features not mentioned here, can also be read from and/or written to by an apparatus according to the invention. Thus, by way of example, it is not absolutely necessary for the markings in the first header area 27' and in the second header area 27" to be at the same distance away from the track centre 26, or for them to have the same length in the track direction.

Figure 7:
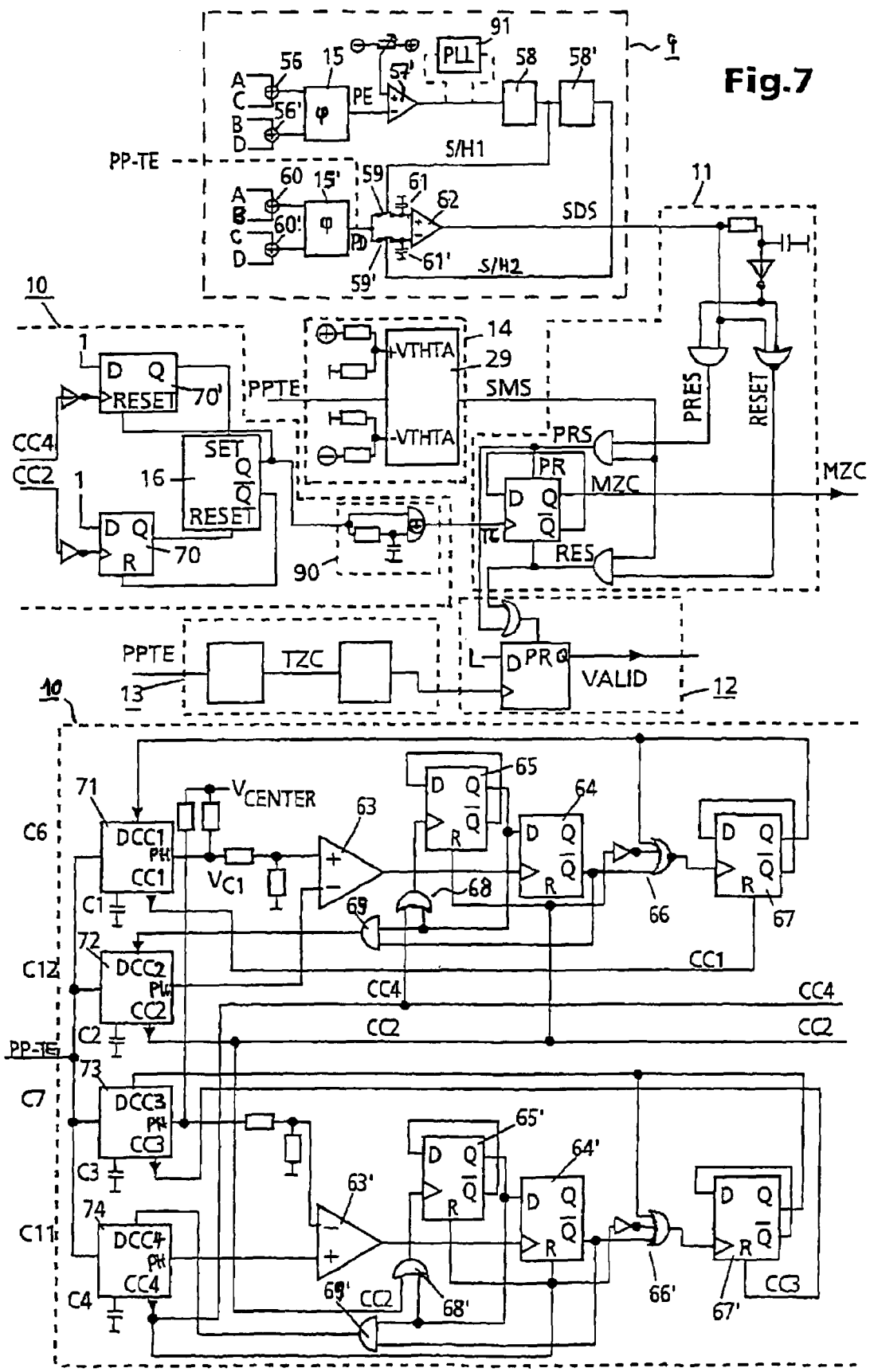
FIG. 7 shows a further variant of an apparatus according to the invention.

FIG. 7 shows an exemplary embodiment of the invention in accordance with the structure specified in FIG. 2. The track centre detector 14 has a window comparator 29 in accordance with FIGS. 3, 4, which compares the track error signal PP-TE with two threshold values ±VTHTA. If the track error signal PP-TE lies within this window, it outputs a track centre signal SMS, which indicates the proximity of the scanning beam to the track centre. This signal ensures that only header sequences are evaluated if the track error signal PP-TE has sufficiently small deviations from the track centre. The track centre signal SMS is fed to the intermediate track detector 11 in this case instead of the header identification signal HES of the exemplary embodiments with respect to FIGS. 3 and 4. The track centre detector 14 therefore performs the function of the header identification unit 8 in this exemplary embodiment.

The intermediate track detector 11 is constructed in a corresponding manner to that in FIGS. 3 and 4 and, therefore, it is not described in any more detail here. The same applies to the validity detector 12 and the track frequency detector 13.

In this exemplary embodiment, the header sequence detector 9 contains both a section which detects the presence of a header area 27 and a section which determines the order of the header areas 271, 27". Input signals of the header sequence detector 9 of FIG. 7 are the detector signals A, B, C, D. Sums of detector elements 6A, 6C and 6B, 6D which are arranged diagonally with respect to one another are formed by means of adders 56, 56'. These are fed to a phase detector 15. If the data markings 25 or header markings 25' scanned by the light beam 3 deviate to the left or right from the axis, lying in the track direction of the moving light spot formed by the light beam 3, then the so-called diagonal summation signals A+C, B+D have a phase difference. This is output as a phase error signal PE by the phase detector 15. A comparator 57 compares the value of the phase error signal PE with a reference value that can be set, and outputs a corresponding signal given the presence of a data area, that is to say if there is a corresponding deviation of the data markings 25 or header markings 25' from the centre of the light spot formed by the light beam 3. This signal is held by a first monostable multivibrator 58 for the period of time which corresponds approximately to half the length of the first header area 27' for the given speed of revolution and scanning position. Subsequently, after the header area 27" has been reached, the period of time which corresponds to half of the second header area 27" is held by the monostable multivibrator 58'. As long as the output signal of the monostable multivibrator 58 is at "high", a switch 59 is closed, and then a switch 59' is closed for the holding time of the monostable multivibrator 58. What is thus achieved is that in each case approximately in the centre of the header areas 27', 27", a voltage value is stored in an associated capacitor 61, 61'. The switches 59, 59' are connected to the output of a phase detector 15', which outputs a phase difference signal PD. The latter corresponds to the phase difference between the signals of the detector elements 6A, 6B, on the one hand, and 6C, 6D, on the other hand, arranged on the left and on the right, respectively, relative to the track direction. To that end, the detector signals A, B are fed to an adder 60 and the detector signals C, D are fed to an adder 60', the output signals of which adders are the input signals of the phase detector 15'. If a header area 27 is traversed, then the intensity of the detector signal pairs A, B and C, D changes relative to one another. The phase difference signal PD is initially positive, for example, and then changes to a negative value in the event of a transition from the first header area 27' to the second header area 27". Firstly, the switch 59 is closed from the beginning of the header area 27' as far as the centre thereof. At =the transition to the second header area 27", switch 59' is closed, and is opened again approximately in the centre of the header area 27". Capacitors 61, 61' are correspondingly charged, and a comparator 62 detects the difference between the charges stored on the capacitors 61, 61' and outputs the sequence detection signal SDS. If a header area 27 having header markings 25' which are arranged in a correspondingly opposite fashion is swept over, then this is also indicated in the sequence detection signal SDS. If, on the other hand, a data area 24 is scanned if the light beam 3 is removed from the track centre 26, then the phase error PE ascertained by the phase detector 15 suffices, under certain circumstances, for setting the monostable multivibrators 58, 58'. In this case, however, the phase difference signal PD changes only to such a slight extent that the comparator 62 does not ascertain a difference and, consequently, does not output a sequence detection signal SDS. In this case, the track centre detector 14, which detects the proximity of the scanning beam to the track centre, prevents any incorrect sequence detection signals from being forwarded to the intermediate track detector 11.

The track crossing detector 10 has a track error signal, for example the track error signal PP-TE, as input signal. Peak value detectors 71, 72, 73, 74 have the track error signal PP-TE as input signal. The peak value detectors 71, 72, 73, 74 have a discharge input DCCn, an output PH and a charging output CCn, wherein n is 1, 2, 3 or 4 respectively. The peak value detectors 71, 72, 73, 74 are respectively connected to a capacitor C1, C2, C3, C4. The outputs PH of the peak value detectors 71, 72 are fed to a comparator 63, and those of the peak value detectors 73, 74 are fed to a comparator 63'. The outputs of the comparators 63, 63' are connected to the clock input of D flip-flops 64, 64', whose D input is connected to the Q output of a further D flip-flop 65, 65'. The reset input of the D flip-flop 64 is connected to the charging output CC2, CC4 of the peak value detector 72 and 74, respectively, and the inverted output $\overline{Q}$ is connected to a logic gate 66, 66'. The output of the logic gate 66, 66' is connected to the clock input of a further D flip-flop 67, 67', whose inverting output $\overline{Q}$ is connected to the input D of the D flip-flop 67, 67' and whose output is connected, on the one hand, to the logic gate 66, 66' and, on the other hand, to the discharge input DCC1, DCC3 of the peak value detector 71, 73. The reset input of the D flip-flop 67, 67' is connected to the charging output CC1, CC3 of the peak value detector 71, 73. A further, inverting input of the logic gate 66, 66' is connected to the charging output CC2, CC4 of the peak value detector 72 and 74, respectively, which is simultaneously connected to the reset input R of the D flip-flops 64, 64' and 65, 65'. The inverting output of the D flip-flop 65, 65' is connected to the D input thereof. The clock input of the D flip-flop 65, 65' is connected via an OR gate 68, 68' to the Q output thereof and to the charging output of the peak value detector 74, 72. The Q output of the D flip-flop 65, 65' and the inverting output $\overline{Q}$ of the D flip-flop 64, 64' are connected via an AND gate 69, 69' to the discharge input of the peak value detector 72, 74.

The output signals of the charging outputs CCn of the peak value detectors 72, 74 which are designated by CC2 and CC4 are respectively fed to the clock input of a D flip-flop 70', 70 after being inverted. The D inputs of the D flip-flop 70, 70' are connected to high level, here indicated by "1". The output Q of the D flip-flop 70' is connected to a set input of a D flip-flop 16, whose output Q is connected to the reset input of the D flip-flop 70'. The output Q of the D flip-flop 70 is connected to the reset input of the D flip-flop 16, whose inverting output $\overline{Q}$ is connected to the reset input of the D flip-flop 70. The output Q of the D flip-flop 16 is connected to the input of a frequency doubler 90, at whose output the track crossing signal TC is present. The function of the frequency doubler 90 has already been described above in relation to the edge detector 55 of FIG. 4.

The track crossing detector 10 in FIG. 7 has the task of finding the maximum values of the track error signal PP-TE. The transition between groove 22 and land 23, or vice versa, takes place at this point in accordance with the above-described structure of the recording medium 1. If the value of the track error signal PP-TE is zero, on the other hand, then the scanning beam impinges on the track centre of groove 22 or land 23.

A variant according to the invention which is likewise represented in FIG. 7 will now be described in more detail. With the aid of the clock of the phase-locked loop 91—illustrated by broken lines—or of a clock which is synchronized with the sequence of the header areas 27 in another way, the function of the monostable multivibrators MF1 and MF2 is replaced; they are omitted in accordance with this variant. A counter which is contained in the phase-locked loop 91 and is not illustrated here and controls more precisely the instants at which the present voltage values of the header sequence signal, of the phase difference signal PD in this case, are transferred to the capacitors 61, 61'. Since the counter is controlled by a clock which is synchronous with the sequence of the header areas 27', 27", matching to rotational speed fluctuations of the recording medium 1 or fluctuations in the data rate is possible, this not being directly possible when the monostable multivibrators 58, 58' are used.

A further variant according to the invention is likewise specified in FIG. 7. In this case, the phase detector 15' and the adders 60, 60' are omitted. The common ends of the switches 59, 59' are in this case connected directly to the track error signal PP-TE, in order to detect the order of the header areas 27', 27".

Figure 8:
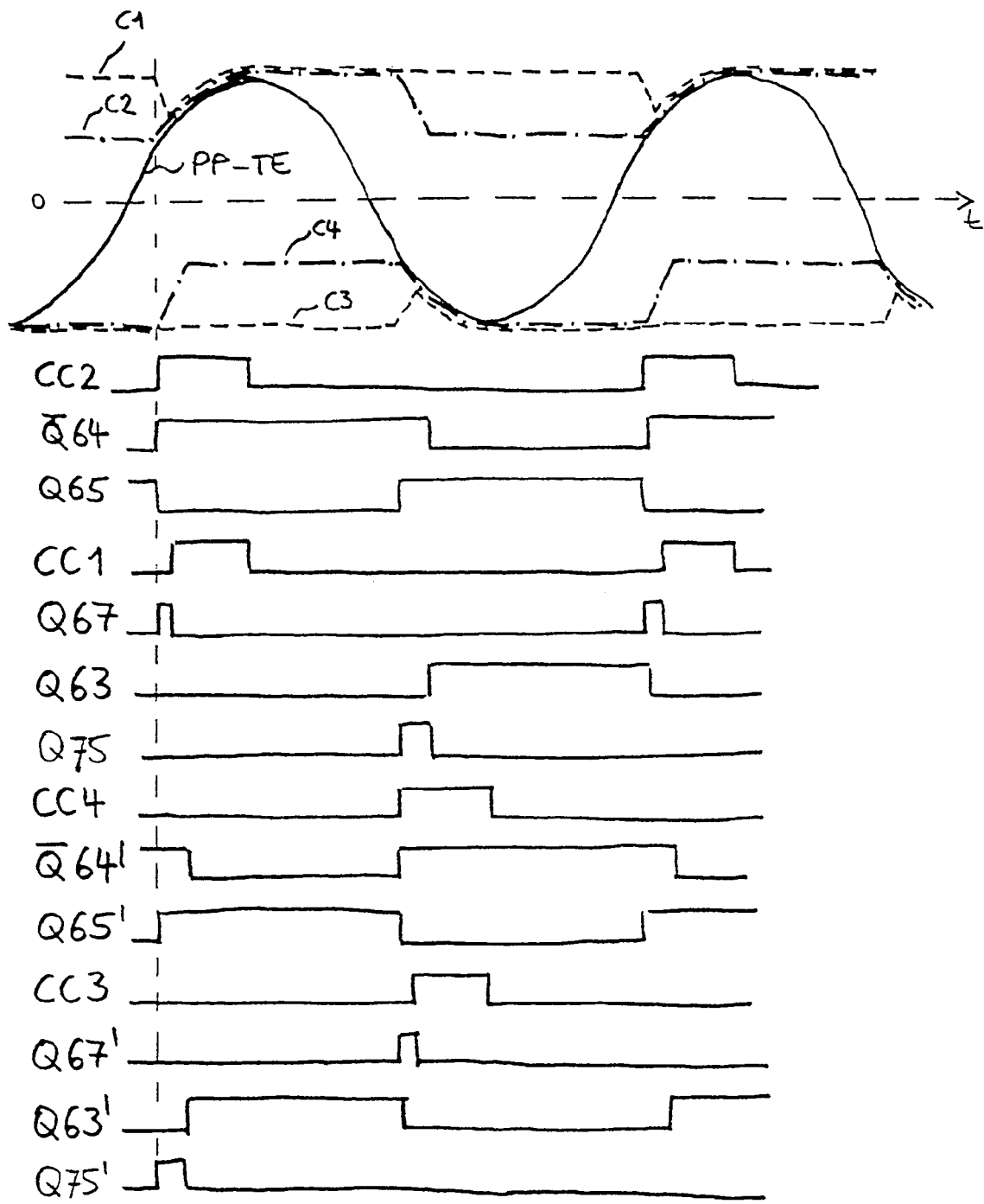
FIG. 8 shows a signal diagram relating to the variant in accordance with FIG. 7.

FIG. 8 shows a signal diagram relating to the track crossing detector 10 of the exemplary embodiment represented in FIG. 7. For the sake of simplicity, the track error signal PP-TE is drawn as a sine curve. The analogous voltage profiles of the voltages of the capacitors C1–C4 are additionally illustrated. Underneath them, the signals CC1 to CC4 and also output signals of further components of the track crossing detector 10 are specified, the respective reference symbol being preceded by the letter of the output, Q or $\overline{Q}$.

Firstly, the voltages across the capacitors C1 and C2 rise with the voltage of the track error signal PP-TE, until the maximum thereof has been reached. This charging operation is manifested as the value "high" in the signals CC1 and CC2 illustrated underneath. When the maximum of the track error signal PP-TE has been reached, the charging of the capacitors C1 and C2 is ended; the signals CC1 and CC2 assume the value "low" again. The output Q of the D flip-flop 65 is reset by the beginning of the charging of the capacitor C2, and the output $\overline{Q}$ of the D flip-flop 64 is set. The output Q of the D flip-flop 67 likewise assumes the value "low", caused by the beginning of the charging of the capacitor C1. The states of these flip-flops are preserved until the charging of the capacitor C4 begins. The rising edge of the signal CC4 passes through the OR gate 68 and sets the output Q of the D flip-flop 65. The D flip-flop 65 is in this case latched by the OR gate 68 itself, in other words can be reset only by renewed charging of the capacitor C2. At the same time, the discharging of the capacitor C2 begins, since both inputs of the AND gate 69 are set. The discharging continues until the output of the comparator 63 toggles from the value "low" to "high". The charge of the capacitor C2 has then fallen to a percentage of the charge of the capacitor C1, the said percentage being predetermined by the voltage divider arranged at the non-inventing input of the comparator 63. The output $\overline{Q}$ of the D flip-flop 64 then assumes the value "low"; the discharging of the capacitor C2 is ended. If the voltage of the track error signal PP-TE then rises again having run through a negative half-cycle, then, starting from a specific value, it exceeds the voltage across the capacitor C2, with the result that the latter starts to be charged anew. At the start of this charging, firstly all the inputs of the triple NOR gate 66 assume the value "low", with the result that the discharging of the capacitor C1 is started via the D flip-flop 67. This discharging operation ends as soon as the voltage of the capacitor C1 becomes smaller than that of the track error signal PP-TE and this becomes visible in the signal CC1. The cycle now begins anew in the manner described above.

The same applies correspondingly to the negative half-cycle of the track error signal PP-TE; the capacitors C3 and C4, the comparator 63', the OR gate 66' and also the D flip-flops 65', 67' are involved in this case.

The falling edges of the signals CC2 and CC4 each indicate when the voltage of the track error signal PP-TE has reached its upper and lower extreme value, respectively. The respective signals CC2, CC4 are inverted and drive the clock inputs of the D flip-flops 70 and 70', respectively, whose D input is at the value "high". Together with the D flip-flop 16, a non-retriggerable RS flip-flop is formed which toggles whenever an extreme value has been reached. The frequency doubler 90 generates a positive edge whenever an extreme value of the track error signal PP-TE has been reached.

Figure 9:
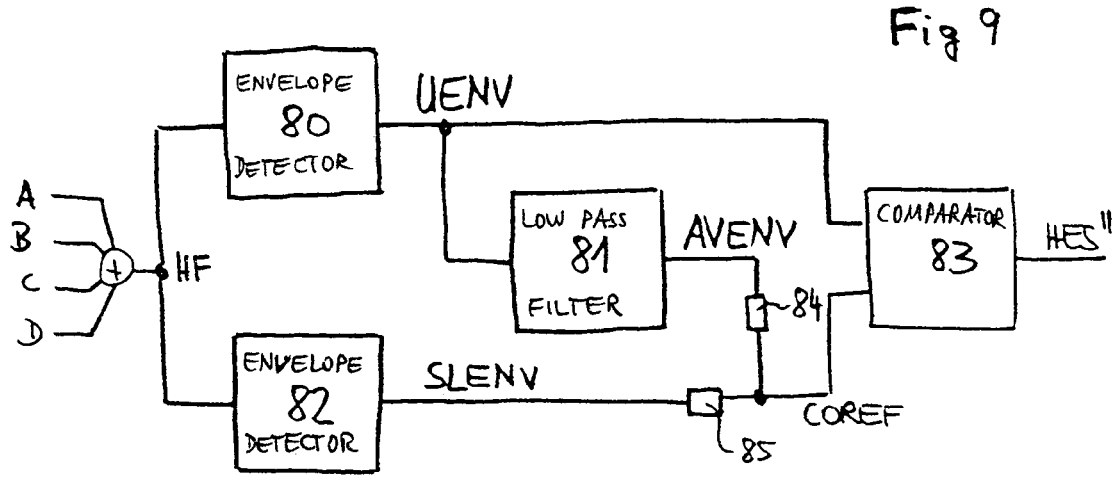
FIG. 9 shows a further variant of part of an apparatus according to the invention.
Figure 10:
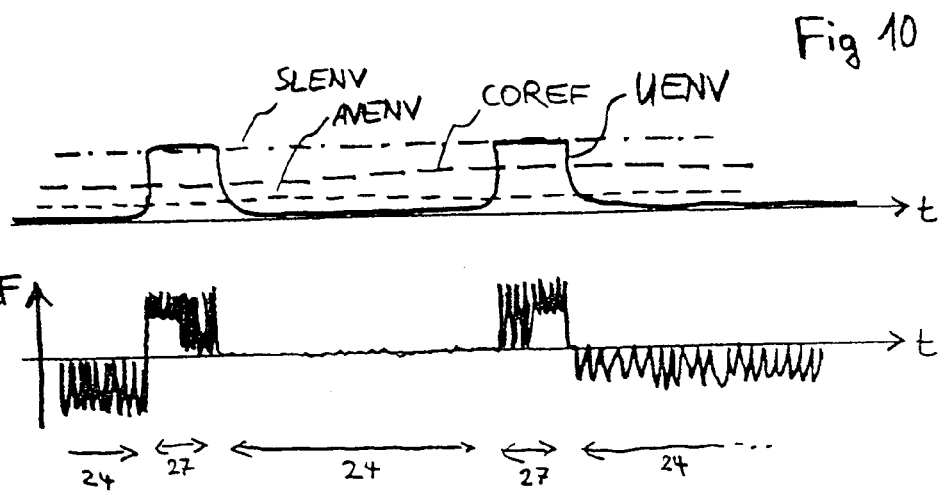
FIG. 10 shows a signal diagram relating to the variant of FIG. 9.

FIG. 9 shows a further variant of part of an apparatus according to the invention, according to which the presence of header areas 27 can be detected. A signal diagram in this respect is represented in FIG. 10. Together with the window comparator 29 corresponding to that in FIG. 3 or FIG. 4, the header identification detector described below constitutes a further variant of the header identification unit 8.

In this case, the summation signal HF of the detector signals A to D is used to detect the scanning of a header area 27. An envelope detector 80 with a fast fall time forms an envelope signal UENV, which is fed to an input of a comparator 83, whose output signal is a header identification signal HES". On the other hand, the envelope signal UENV is passed through a low-pass filter 81, whose output signal is an averaged signal AVENV. The latter represents the average value of the envelope of the summation signal HF at and between the header areas. An envelope detector 82 with a slow fall time forms a slow envelope signal SLENV, which forms the maximum values of the envelope in the header area 27 and holds this value. With the aid of two resistors 84, 85, a predetermined ratio is formed between the signals AVENV and SLENV and the resulting comparison signal COREF is fed to the comparator 83 at its second input. Deriving the comparison signal COREF from the weighted difference between the signals SLENV and AVENV affords the advantage that possible fluctuations in the amplitude and in the offset of the summation signal HF are automatically compensated for, since the voltages of the signals SLENV, UENV and AVENV change in proportionally the same way as the summation signal HF.

In the upper part of FIG. 10, the signals UENV, SLENV, AVENV and COREF are plotted against time, and underneath them is the associated summation signal HF from which these signals are derived. It is evident that the summation signal HF lies above the time axis illustrated whenever a header area 27 is passed through; otherwise, it lies essentially below it. The data areas 24 which are in each case at the edge of the figure are provided with data markings 25; the middle data area 24 is not. The summation signal HF does not exhibit any modulation, therefore, in the middle data area 24. What is involved here is a data area that has not yet been written to.

A further variant according to the invention, which is not illustrated here, includes the simplification whereby the upper envelope signal UENV is compared with a fixed, predetermined comparison voltage COREF'.

In particular, the idea of the invention relates to the counting and track jumping. The track regulator is not activated in the time during which track jumping is effected. Reading of address information is more or less impossible during this time. The present invention describes an advantageous possibility for determining the track type of the track which is currently being crossed without the track regulator being closed and without the presence of address information items. This makes it possible to determine the type of adjacent tracks and the number of crossed tracks in a logically consistent manner as the actuator moves further. The method according to the invention makes it possible first to reliably initiate the closing of the tracking regulator. According to the prior art, in order to identify the track type, it is generally presupposed that the track regulator is already active.

What is claimed is:

1. Apparatus for reading or writing data markings of an optical recording medium having data markings arranged along a track and header markings arranged laterally offset with respect to the center of the track, and an intermediate track being arranged between two adjacent tracks, the apparatus comprising:
   a header identification unit comprising a high frequency path, a low-frequency path and a signal detector, and having a track error signal applied to it;
   a header sequence detector for detecting a sequence of said laterally offset header markings;
   a track crossing detector; and
   an intermediate track detector for generating an intermediate track signal, wherein the intermediate track detector is connected to outputs of the header identification unit, of the track crossing detector and of the header sequence detector.

2. Apparatus according to claim 1, wherein the header sequence detector comprises envelope detectors, to which a track error signal is fed, and has outputs connected to a comparator.

3. Apparatus according to claim 1, wherein the header sequence detector has a phase detector, which is fed with signals derived from detector elements of a multi-zone detector of the apparatus.

4. Apparatus according to claim 1, wherein the track crossing detector has a track error signal applied to it, and comprises one of a phase shifter and a peak value detector.

5. Apparatus according to claim 4, wherein the track crossing detector comprises at least two peak value detectors, which are connected as extreme value detectors.

6. Apparatus according to claim 1, further comprising a validity detector for outputting a validity signal, and a track crossing frequency detector for supplying a track cross signal to the validity detector.

7. Apparatus according to claim 6, wherein the header sequence detector comprises envelope detectors, to which a track error signal is fed, and has outputs connected to a comparator.

8. Apparatus according to claim 6, wherein the header sequence detector has a phase detector, which is fed with signals derived from detector elements of a multi-zone detector of the apparatus.

9. Apparatus according to claim 6, wherein the track crossing detector has a track error signal applied thereto, and comprises one of a phase shifter and a peak value detector.

10. Apparatus according to claim 9, wherein the track crossing detector comprises at least two peak value detectors, which are connected as extreme value detectors.

11. Apparatus according to claim 6, wherein the header identification unit evaluates a summation signal of the detector signals.

12. Method for generating an intermediate track signal in an apparatus for reading or writing data markings of an optical recording medium having data markings arranged along a track and header area containing one or more header markings arranged with alateral offset with respect to the center of the track, and an intermediate track being arranged between two adjacent tracks, comprising the steps of
   checking a signal derived from detector elements of the apparatus for the presence of signal components which indicate the lateral offset of said header markings,
   if the signal components are present, determining succession information about the signal components originating from differently arranged header markings within the header areas,
   generating a signal corresponding to a track crossing frequency,
   generating the intermediate track signal from the succession information and the signal corresponding to the track crossing frequency,
   detecting the track crossing frequency and, if a limit value is undershot, generating an invalidity signal, which is cancelled only when signal components which are typical of header areas are present once again.

* * * * *